April 22, 1924.
J. B. BURDETT
1,491,192
PRESSURE REGULATING AND INDICATING ATTACHMENT FOR FLUID DISTRIBUTION
Filed Jan. 25, 1923   3 Sheets-Sheet 3
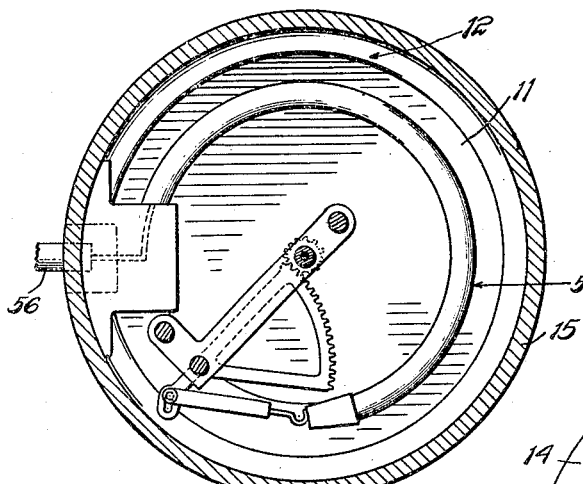
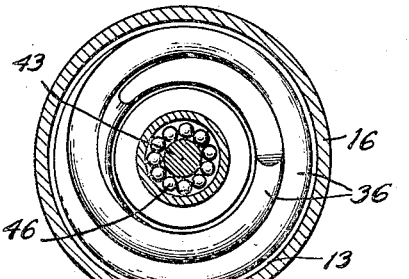
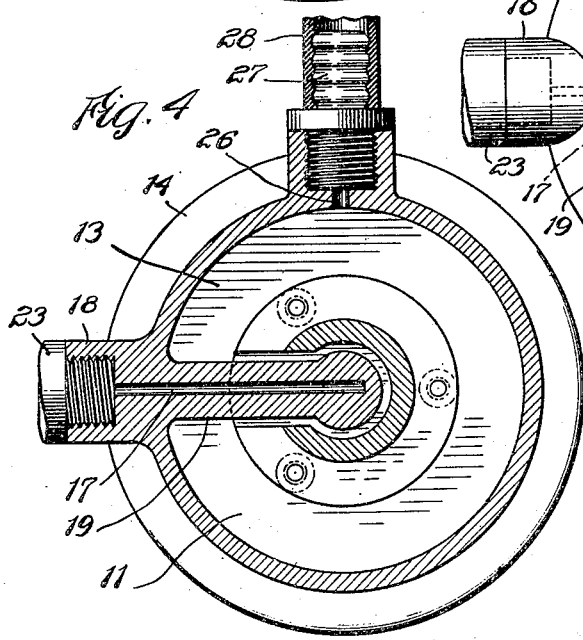
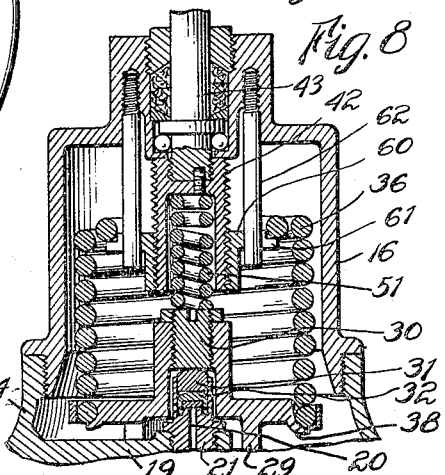
Inventor
John B. Burdett Patented Apr. 22, 1924.

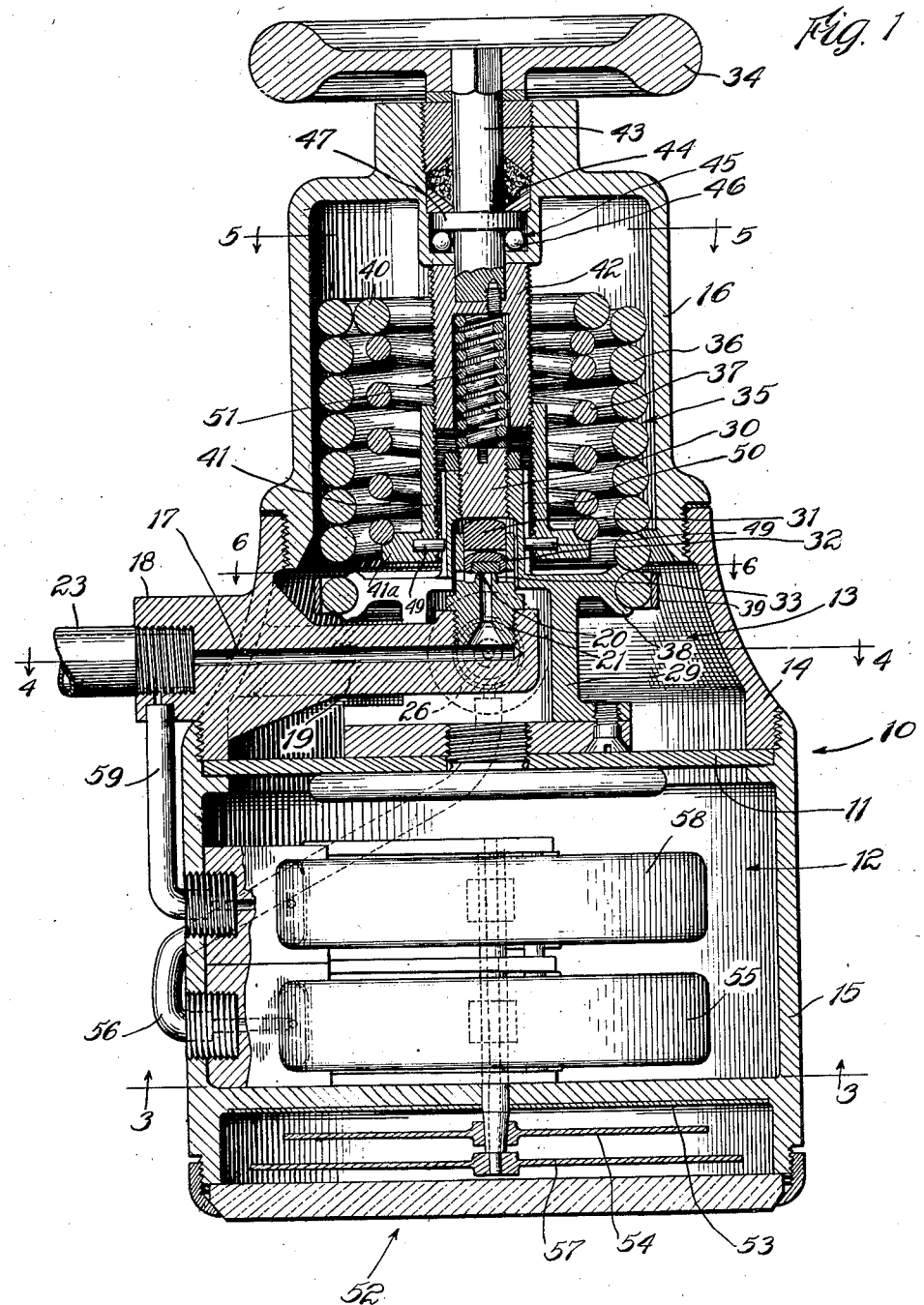

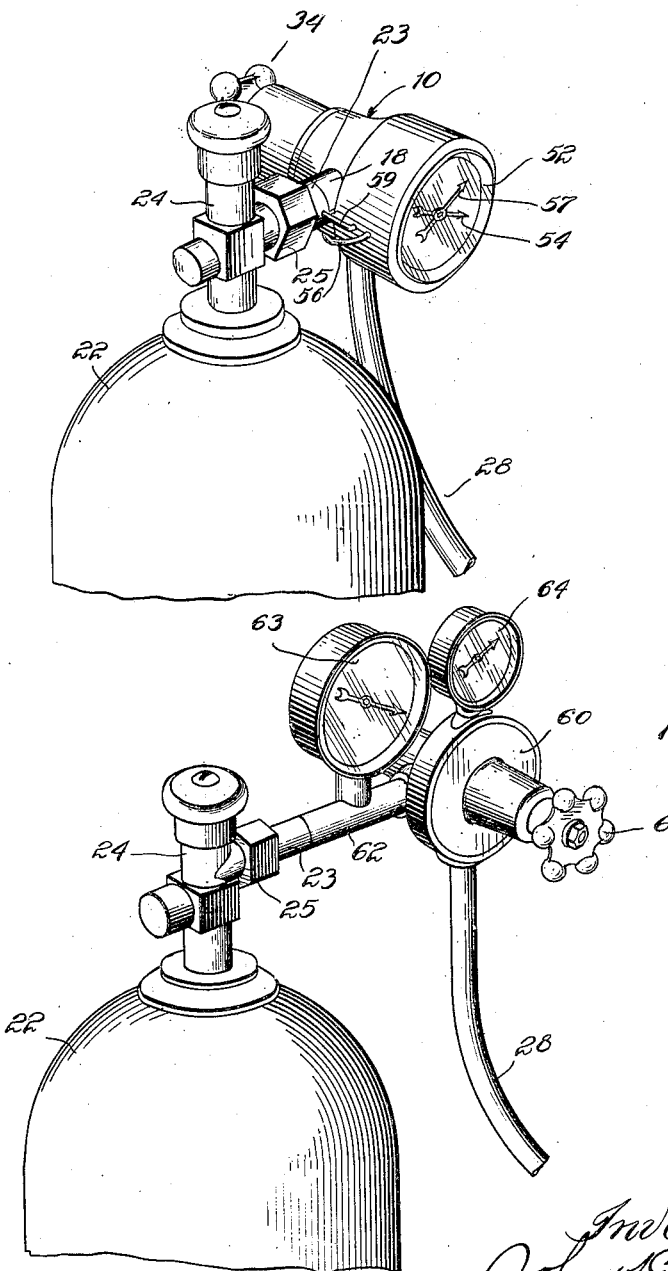

1,491,192

UNITED STATES PATENT OFFICE.

JOHN B. BURDETT, OF HIGHLAND PARK, ILLINOIS, ASSIGNOR TO BURDETT MANUFACTURING COMPANY, OF CHICAGO, ILLINOIS, A CORPORATION.

PRESSURE REGULATING AND INDICATING ATTACHMENT FOR FLUID DISTRIBUTION.

Application filed January 25, 1923. Serial No. 614,801.

*To all whom it may concern:*

Be it known that I, JOHN B. BURDETT, a citizen of the United States, residing at Highland Park, in the county of Lake and the State of Illinois, have invented certain new and useful Improvements in Pressure Regulating and Indicating Attachments for Fluid Distribution, of which the following is a specification.

This invention relates to improvements in attachments for reducing, controlling, and indicating the draw-off pressures from high pressure supply sources such as storage tanks and high pressure pipe lines.

To fully explain some of the advantages of my invention I shall refer briefly to the art of gas welding and cutting, in which it is especially used. In the art of gas welding it is customary to compress the gases, as they are manufactured, into receptacles convenient for storage and transportation. As a result the gases are under extremely high pressure and, since the pressure required in the torch is comparatively low, it is necessary to use a device for reducing and controlling the draw-off pressure in the line from the storage tank to the torch. Also it is customary to have a gauge for indicating the supply pressure and one for the draw-off pressure. Heretofore these devices have been built separately and generally assembled on a short pipe so that they can be attached in a unit, when required. The result is an unwieldy device to carry around and, when in use, the regulator and gauges stick out in all directions quite aways from the point of support and are easily broken off. They present a very confusing appearance to the operator for reading the results of any adjustments he might be making on the proper gauge, especially where two or more attachments are in use.

With the foregoing in view, this invention provides an attachment where all the necessary devices are assembled in one structure and the controlling handle is in a natural location with reference to the gauge which belongs with it.

My invention also has a further advantage in providing means for positively locking the supply line against leakage when the torch is not in use, and other advantages which will appear in the following description.

Referring to the accompanying drawings:

Figure 1 is a horizontal axial section of a device embodying my invention.

Figure 2 is a view in perspective of the device attached to a storage tank.

Figure 3 is a section on line 3—3 of Figure 1.

Figure 4 is taken on line 4—4.

Figure 5 on line 5—5.

Figure 6 on line 6—6 of Figure 1.

Figure 7 is a perspective view of well known attachments in place on a storage tank, and is shown for comparison to more clearly illustrate advantages of my invention.

Figure 8 is a section of a modified form.

My device has a tubular housing 10 with a diaphragm 11 therein, positioned back from one end, forming a compartment 12 and a chamber 13. The housing 10 is built up of a body portion 14, a shell 15 and a bell housing 16. The shell 15 is threaded onto the body 14, and clamps the diaphragm 11 in place, and the part 16 threads into the body 14 at the rear. The inlet 17 is formed in the body portion 14 and leads from a boss 18 in through a tubular portion 19 and terminates in a centrally located inlet opening 20 in a nipple 21 which is threaded into the tube 19 and points away from the diaphragm 11.

The device is supported and connected to the storage tank 22 by a flanged nipple 23 which is threaded into the boss 18. It is fastened to the tank valve 24 by the nut 25.

An outlet 26, also formed in the body 14, has a nipple 27 for securing the hose 28 which connects to a torch not shown.

When the device is attached to the tank 22 and the valve 24 is opened, fluid under high pressure flows into the chamber 13 through the inlet 20, fills the chamber 13 and deflects the diaphragm 11 outward. Outward movement of the diaphragm 11 tends to close the inlet 20 by the following. A member 29, commonly called a stirrup, is secured to the diaphragm 11, and extends around the tube 19 and the nipple 21. It, 29, carries a set screw 30, in alignment with and having a flat end facing the inlet 20. A plunger 31 and a valve 32 are interposed between the set screw 30 and a protruding valve seat 33 formed around the inlet opening 20. The plunger 31 and the valve 32 are guided in a tubular portion also formed in the nipple 21. Accordingly, when the diaphragm 11 deflects outwardly, it carries the stirrup 29 and the adjusting screw 30 with it, pressing on the plunger 31 and forcing the valve 32 against its seat 33.

The pressure in the chamber 13 at which the inlet 20 will be closed is adjustably regulated by the hand wheel 34, which adjusts pressure resisting means generally referred to as 35. This means, 35, comprises a spring 36, in tension, and a spring 37, in compression. The spring 36 is attached to the stirrup 29 by engaging at its forward end, in a grooved flange 38 of the stirrup 29, and is secured by a band 39. The coil 40 at the rear end of the spring 36 is reduced in diameter to form a seat for the spring 37. The spring 37 is smaller than 36 and is placed within it to economize space and reduce the bulk of the device. The forward end of the spring 37 seats on a flange 41ª of the adjusting nut 41. The nut 41 is positioned by means of a lead screw 42, secured to a stem 43, which is rotatably mounted in the rear end of the housing member 16. The stem 43 is provided with a packing gland 44, formed in 16, and a thrust bearing 45 which consists of ball bearings 46 in the bottom of the gland 44 and underlying a flange 47 formed on the stem 43. The hand-wheel 34 is secured to the portion of the stem 43 which extends through the housing 16. The nut 41 is prevented from rotating by two guide pins 49—49 which are mounted in the nut 41 and engage in slots 50 in the stirrup 29.

A valve-closing spring 51, in compression, is mounted within the screw 42 and bears on the end of the adjusting screw 30.

In the compartment 13 is located a well known double pressure indicator 52, having its dial 53 located at the end of the shell 15 and in axial alignment with the hand-wheel 34 which is at the opposite end of the housing 10. The pointer 54 indicates the pressure in the chamber 13, and is operated through the indicator mechanism 55 which is connected by a tube 56 to the outlet 26. The pointer 57 indicates the storage pressure. It is operated by the indicator mechanism 58 which is connected through the tube 59 to the inlet passage 17 at the boss 18.

Figure 8 shows the device with a single spring. The parts are substantially the same as in the preferred form with the following exceptions. An adjusting nut 60 has a flange 61 which engages the free end of the spring 36. The nut 60 threads on the screw 42 and is held from rotating by guides 62 mounted in the housing 16 and in slidable engagement with the flange 61.

A comparison of Figure 1 and Figure 7 will readily show certain advantages of my invention. As stated above Figure 1 shows my attachment in use and Figure 7 shows a well known attachment which I will briefly describe as follows:

A regulator unit 60 is carried by and connected to the tank 22 by a tube 62. This tube 62 threads into a boss on the regulator 60 and carries on a short stem, a high pressure indicator 63. A low pressure indicator 64 is mounted on the regulator. These parts 60, 62, 63 and 64 and the nipple 23 which is threaded into the tube 62, are attached in a unit to the tank 22 and secured by the nut 25, which threads onto a boss of the valve 24.

The attachment shown in Figure 7 extends out from the point of support, and the parts stick out in all directions, making an awkward device to operate and a cumbersome article for the welder to carry around in his kit. My device, as shown in Figure 1, attaches close to the valve 24 and is convenient to operate and transport, as well as having other advantages.

In use my device operates substantially as follows: When there is no pressure in the inlet passage 17, the spring 51 tends to hold the valve 32 in its closed position, against the resistance of the springs 36 and 37, but, when the high pressure supply is connected to the inlet passage 17, the valve 32 is forced away from its seat. Fluid then enters the chamber 13 and fills it until the diaphragm is deflected outward against the resistance of the springs 36 and 37, and causes the valve 32 to close.

The fluid is drawn off as required, allowing the pressure on the diaphragm to fall slightly until the springs 36 and 37 can pull the diaphragm 11 in and reopen the valve 32 to admit more fluid to enter from the tank 22, keeping the draw off pressure constant.

When desired the nut 41 may be positioned inwardly until it bears directly on the stirrup 29. This provides a positive means for locking the valve 32 in a closed position, preventing a slow leakage of the fluid into the chamber 13 building up a pressure that is higher than the regulator is adjusted for when the apparatus is not in use for a time.

As 41 is drawn back by turning the wheel 34, the smaller spring 37 is compressed until its coils are closed and resistance is applied to outward movement of the diaphragm through the heavier spring 36 alone providing a higher range of draw-off pressure adjustments.

The thrust bearing 45 allows the wheel 34 to be easily turned against the heavy load on the diaphragm 11, and prevents wear on the step or flange 47.

I wish to include the generic claims on the valve operating means and the pressure resisting means, which have many advantages, in my accompanying application; claiming them as a species in this application in addition to claims on other features.

Having thus described my invention, I claim:

1. In combination in a pressure regulator, a housing, a diaphragm in the housing forming a compartment and a chamber having an inlet and an outlet, pressure-regulating means in the chamber, and means within the compartment for indicating both the pressure at the inlet and the pressure at the outlet.

2. In combination in a pressure regulator having a diaphragm and an inlet and an outlet, a dial indicator mounted adjacent to and in axial alignment with the diaphragm and adapted to show both the pressure at the inlet and the pressure at the outlet.

3. In combination, a housing, a diaphragm in said housing forming a chamber and a compartment, pressure regulating means in said chamber having an inlet and an outlet connection, means leading into the chamber for adjusting said regulating means, a handle externally mounted at the rear of the chamber for operating second mentioned means, said compartment conveniently containing dial indicators for registering pressure at the inlet and the outlet and having the dial oppositely arranged and in alignment with said handle.

4. In combination in a pressure regulator having a chamber with an inlet and an outlet, a diaphragm covering said chamber, means within the chamber attached to the diaphragm for controlling the inlet, a spring within the chamber used in tension and attached to the diaphragm, a spring mounted within and bearing on the free end of first mentioned spring, means operative from without the chamber for adjusting the tension of both springs simultaneously.

5. In combination, a housing containing a chamber having an inlet and an outlet, a diaphragm covering said chamber, a stirrup attached to said diaphragm within the chamber, inlet controlling means cooperating with said stirrup, a spring attached to the stirrup, a spring mounted within and bearing on the free end of first mentioned spring, an adjusting nut bearing on opposite end of second mentioned spring, a lead screw cooperating with said nut and rotatably mounted in and having a stem passing through said housing, and means for preventing rotation of said nut.

6. In combination, a housing containing a chamber having an inlet and an outlet, a diaphragm covering the chamber, a stirrup attached to the diaphragm within the chamber, means cooperating with the stirrup for controlling the inlet, a coiled spring within the chamber and attached to said stirrup, a spring mounted within and bearing on the free end of the first mentioned spring, an adjusting nut bearing on the opposite end of the second mentioned spring, a lead screw cooperating with said nut and rotatably mounted in and having a stem passing through said housing, an anti-friction bearing in the housing for taking the inward thrust of said stem, means for preventing rotation of the nut, said nut being adapted to be adjusted into direct contact with the stirrup.

In testimony whereof, I affix my signature.

JOHN B. BURDETT.